United States Patent
Sherman

[11] Patent Number: 5,258,651
[45] Date of Patent: Nov. 2, 1993

[54] ELECTRICALLY BIASED STARTING REACTION DEVICE FOR A POWER TRANSMISSION

[75] Inventor: James F. Sherman, Brighton, Mich.

[73] Assignee: General Motors Corporation, Detroit, Mich.

[21] Appl. No.: 870,381

[22] Filed: Apr. 17, 1992

[51] Int. Cl.⁵ .................. F16H 37/00; F16H 37/06
[52] U.S. Cl. ........................ 290/23; 290/20; 290/29; 180/65.2; 180/65.4
[58] Field of Search ............. 180/65.2, 65.4; 290/20, 290/23, 29; 475/1, 2, 5

[56] References Cited

U.S. PATENT DOCUMENTS

| | | | |
|---|---|---|---|
| 1,762,004 | 6/1930 | Wellman | 290/29 |
| 3,620,323 | 11/1971 | Maeda et al. | 290/23 |
| 3,732,751 | 5/1973 | Berman et al. | 475/2 |
| 5,120,282 | 6/1992 | Fjälström | 475/5 |

*Primary Examiner*—A. D. Pellinen
*Assistant Examiner*—Robert Lloyd Hoover
*Attorney, Agent, or Firm*—Donald F. Scherer

[57] ABSTRACT

A planetary gear arrangement, which provides a starting device for a power transmission, has an electrically biased reaction member. The reaction member is operatively connected with an electric motor/generator that is selectively controlled to establish a braking force at the reaction member. A fluid operated friction brake is disposed in parallel with the motor/generator to provide a selective fully engaged brake to establish the reaction, or a slipping brake to assist the generator in establishing the reaction at the planetary gear arrangement. A fluid operated clutch is also associated with the planetary gear arrangement to provide a selective 1:1 ratio within the planetary gear arrangement. The planetary gear arrangement cooperates with the park mechanism in the transmission and the motor/generator to provide an engine cranking mechanism which is useful during engine start.

4 Claims, 1 Drawing Sheet

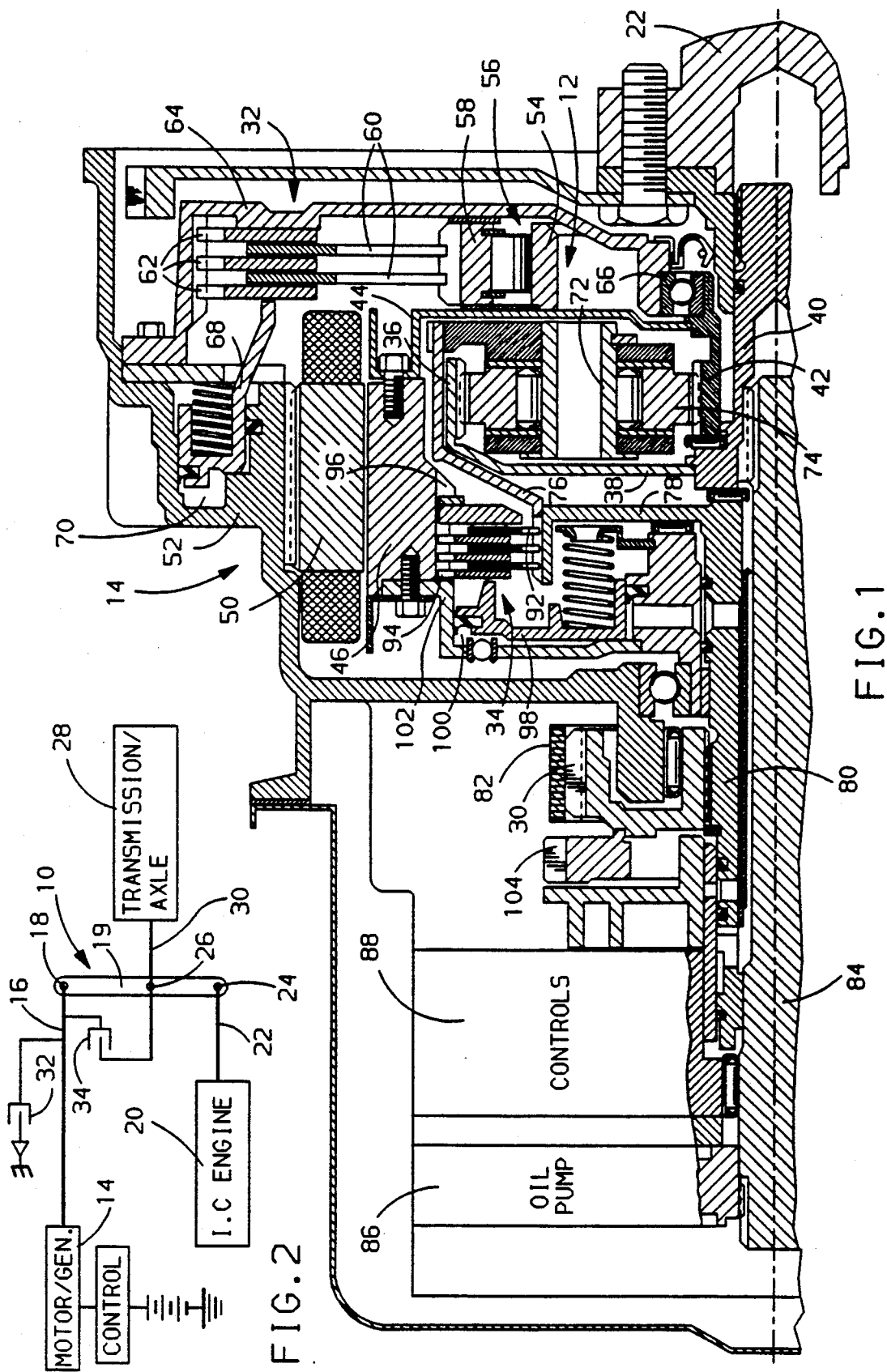

ELECTRICALLY BIASED STARTING REACTION DEVICE FOR A POWER TRANSMISSION

BACKGROUND OF THE INVENTION

This invention relates to starting mechanisms for power transmissions, and more particularly, to starting mechanisms having a controllable two-speed planetary in the starting mechanism.

In particular, this invention relates to a starting device having an electrical generating member for providing a controlled reaction in a planetary gear set which is disposed between a prime mover and a multi-speed power transmission.

Current commercially available power transmissions use either a hydrodynamic torque transmitting device or a selectively engageable friction clutch as the starting device to control vehicle launch. While these devices perform the starting procedure well, there is room for improvement in the efficiency of the torque converter and in the torque multiplying capability of a selectively engageable friction clutch.

SUMMARY OF THE INVENTION

The present invention overcomes the disadvantages of the prior art by incorporating an electrically biased reaction device in parallel with a selectively controllable friction reaction device in a two-speed planetary gear arrangement. The reaction device cooperates with the planetary arrangement to provide a low speed high torque multiplying ratio, and the second speed is determined by the engagement of a friction clutch, which establishes a 1:1 drive in the planetary gear arrangement.

The electrically biased reaction device will permit the reaction member of the planetary gear arrangement to rotate during launch to assist in a smooth start-up. The electrically biased reaction device can supply power to charge a storage battery, or provide other electrical functions while it is operating as a reaction device. Thus, the reaction energy is useful in the overall vehicle system to provide improved overall efficiency when compared with slipping fluid reaction mechanisms.

When it is desired to provide a quicker launch; i.e., bring the vehicle to speed more rapidly, the friction reaction device is applied in parallel with the electrically biased reaction device, thereby reducing or eliminating the rotational movement of the reaction member of the planetary gear arrangement.

The electrically biased reaction device is a motor/generator mechanism which is capable of absorbing energy (i.e. operate as a generator) or dispensing energy (i.e. operate as a motor). During operation as a motor, the device will provide an engine cranking mechanism for the vehicle. The transmission utilized with the starting device will have a conventional park gear arrangement disposed therein, or in the alternative, a park gear arrangement can be placed on the transmission input to assist in engine cranking.

During engine cranking, with the park gear engaged, the electrically biasing device will operate as a motor to drive one member of the planetary gear arrangement. The park gear mechanism will provide a brake to establish a stationary element within the planetary arrangement, such that the other member of the planetary, which is connected with the engine, will provide a cranking function at the engine to establish the required engine speed for starting. Thus, this invention also provides for the elimination of the starter motor on the vehicle. If desired, the mechanism can also operate as a generator during normal vehicle operation to provide electrical power for both charging the battery and for operating various electrical devices on the vehicle.

It is therefore an object of this invention to provide an improved starting mechanism for a power transmission, including an electrically biased reaction control assembly.

It is another object of this invention to provide an improved starting mechanism, as set forth above, wherein the electrically biased reaction control assembly is operatively connected with a gear member of a planetary gear arrangement.

It is still another object of this invention to provide an improved starting mechanism having a motor/generator in parallel relation with a selectively engageable friction device to bias the friction characteristics of the friction device during transition from a dynamic status to a static status.

It is yet another object of this invention to provide an improved starting mechanism having a motor/generator unit, wherein the motor generator is controllable to effect a reduction in transient torque spikes introduced from the engine.

It is a further object of this invention to provide an improved starting mechanism, as set forth above, wherein a selectively engageable friction brake is disposed in parallel with the electrically biased reaction control assembly for operation during high torque demand, and also wherein a selectively engageable friction clutch is provided to establish a 1:1 ratio in the starting device.

It is a still further object of this invention to provide an improved starting mechanism for a planetary transmission having an electrically biased planetary gear arrangement which is controlled to establish a two-speed input mechanism for the transmission, and also wherein the electrically biased reaction mechanism is operable to provide a cranking motor for engine start procedures and a generator for providing electricity for general vehicle operation.

These and other objects and advantages of the present invention will be more readily apparent from the following description and drawings.

DESCRIPTION OF THE DRAWINGS

FIG. 1 is a cross-sectional elevational view of a portion of a power transmission showing the starting device for the transmission.

FIG. 2 is a diagrammatic representation of the starting device and the associated engine and transmission.

DESCRIPTION OF THE EMBODIMENT

Referring to the drawing, there is seen particularly in FIG. 2, a starting device 10 represented in lever analogy. The starting device is preferably a planetary gear arrangement, such as 12, shown in FIG. 1. In the lever analogy shown in FIG. 2, a motor/generator 14 is operatively connected through a link 16 to one point 18 on a lever 19. The lever is also connected to a conventional internal combustion engine 20 through the crankshaft 22 thereof to a point 24 on the lever 19. A third point 26 of the lever 19 is operatively or drivingly connected with a transmission and vehicle axle 28 through an input shaft or member 30. The motor/generator may be controlled through the use of a system such as that described in U.S. Pat. No. 4,883,973 issued Nov. 28 1989 to Lakey et al., and assigned to the assignee of the present invention.

The point 18 of the lever can also be grounded or caused to be a reaction or fulcrum by a selectively engageable friction brake 32. A selectively engageable friction clutch 34 is operable to join two points of the lever 19; namely, 18 and 26, together, such that the lever 19 will operate as a 1:1 device providing direct speed transmission without torque multiplication.

In looking at the starting device 10, it is seen that if the point 18 is maintained stationary or as a reaction or fulcrum element, the engine input at point 24 will be multiplied as to torque transmission prior to delivery to the transmission 28. Thus, the engine torque is multiplied thereby providing improved starting performance for the vehicle. The starting device is shown in more detail in FIG. 1, wherein the planetary gear arrangement 12 includes a ring gear 36 which is drivingly connected through a hub 38 to a shaft 40 which, in turn, is drivingly connected to the engine crankshaft 22. The planetary gear arrangement 12 also has a sun gear 42 which is drivingly connected through a hub 44 to a rotor 46 of the motor generator assembly 14. The motor generator assembly 14 also has a stator portion 50 which is grounded to a transmission casing or housing 52.

The hub 44 has formed thereon or secured thereto an inner race 54 of a one-way device 56. The one-way device 56 also has an outer race 58 which is connected with the friction brake 32 which is composed of a plurality of friction discs 60 splined to the outer race 58 and digitally intermeshed with a plurality of friction discs 62 which, in turn, are secured to the transmission case 52 through a hub 64 which rotatably supports a bearing 66, the inner race of which supports the sun gear 42.

The friction discs 62 are operatively associated with an annular piston 68 which is slidably disposed in a fluid chamber 70 formed in the housing 52. The chamber 70 is selectively energized with fluid pressure to cause the piston 68 to enforce frictional engagement between the friction discs 60 and 62, thereby providing a friction brake for the sun gear 42 through the one-way device 56.

The planetary gear arrangement 12 also has a carrier assembly 72, which includes a plurality of pinion gears 74 disposed in meshing relationship with the ring gear 36 and sun gear 42. The carrier 72 is drivingly connected through a hub 76 and a hub 78 with an output shaft 80 which has drivingly connected therewith a transmission input member or sprocket 30. The sprocket 30 meshes with a chain 82 which, in turn, meshes with another sprocket, not shown, in a conventional manner. This type of transmission input arrangement is well known and has been used for many years in conventional front wheel drive transmission arrangements.

The crankshaft 22 continuously drives the shaft 40, as well as a control pump shaft 84 which is drivingly connected with a conventional fluid pump 86. The fluid pump 86 provides fluid pressure which is distributed by conventional transmission controls 88 to engage the various conventional fluid operated clutches and brakes which are disposed within the transmission, and also the fluid operated brake 32 and the fluid operated clutch 34 which are associated with the starting device.

The fluid clutch 34 includes a plurality of friction discs 92 which are drivingly connected with the hub 76 and a plurality of friction discs 94 which are digitally interspersed with the discs 92 and drivingly connected to a spline 96 which is formed on the rotor 46 of the motor generator 14.

A fluid operated piston 98 is disposed in a chamber 100 formed in a flange 102 secured for continuous rotation with the rotor 46. When fluid pressure is admitted to the chamber 100, the piston 98 will cause frictional engagement of the friction discs 92 and 94, such that the rotor 46 will rotate in unison with the carrier 72 and sun gear 42 to cause a 1:1 ratio within the planetary gear arrangement 12. Thus, the rotor 46 will rotate in unison with the crankshaft 22 of the engine.

A park gear 104 is secured to the sprocket 30 and is operatively engaged with a pawl member, not shown, either individually or in unison with the conventional park system, which is utilized in the transmission 28. When the park gear 104 is engaged by a pawl, and therefore held stationary, the transmission input member will also be stationary and thus establish the carrier 72 as a reaction member within the planetary gear arrangement 12. At this time, the motor generator 14 can be operated as a motor, thereby driving the sun gear 42 which, because of the stationary carrier 72, will cause the ring gear 36 to rotate which, in turn, will drive the engine crankshaft 22.

The planetary gear arrangement provides a high torque ratio when operating in this mode and therefore will provide high cranking torque for the engine and will provide sufficient speed for the engine to reach the speed necessary for starting. When the engine has started, the ring gear 36 will drive the sun gear 42 and if the park gear 104 is released, the motor generator 14 will provide an electrical bias for the sun gear, thereby creating a reaction torque at the sun gear 42. With a reaction torque at the sun gear 42, a driving torque is directed to the transmission input 30 via the planetary carrier 72. The input torque at the transmission input 30 will be multiplied relative to the engine torque at crankshaft 22 because of the planetary gear ratio fixed between the ring gear 36 and the transmission input 30. Thus, a high starting torque can be provided.

In some systems where extremely high starting torques are required, it may be desirable to provide an additional starter motor which will assist the motor/generator 14 during the starting mode. Such a starting motor can be connected in a conventional manner to a flywheel secured to the crankshaft 22. The size of the additional starting motor would, of course, depend upon the cranking torque required for a particular engine. For example, a diesel engine with an extremely high compression ratio (20:1) would need a much larger additional starting motor than a V6 spark ignition engine having a conventional compression ratio of (9:1).

The rotational speed of the transmission input 30 will depend upon the load imposed upon the motor generator 14. The higher the electrical load imposed on the generator portion of the motor generator 14, the higher the reaction torque will be. Thus, the operator can control the launch speed of the vehicle by controlling the generator load. This load can be controlled by the throttle position or by a gear selector member within the transmission. Preferably, the throttle position will provide the reaction necessary, such that at high throttle levels, high torque reaction will be generated and, if desired, the brake 32 will be engaged either completely or slippingly to assist the reaction at the sun gear 42, thereby providing increased transmission input speed at the sprocket 30.

As the brake 32 approaches complete engagement, that is, zero slip, the friction characteristics thereof will change. This change is commonly termed a "rooster tail" at which an increase in the frictional torque capacity will occur. This increased capacity in the friction device can provide a perceptible drive line disturbance, thus making the smooth launch more difficult. The motor/generator 14 can be controlled at this point to provide a reaction torque bias which will mirror the rooster tail effect, thereby providing a substantially constant apparent coefficient of friction. In other words, the reaction torque provided by the motor/generator 14 biases the coefficient of friction of the brake 32 to provide a smooth launch.

After the vehicle has been launched or is rolling on the highway, the clutch 34 can be selectively engaged thereby causing the planetary gear arrangement 12 to rotate in a 1:1 or unitary condition. When the clutch 34 is engaged, the one-way device 56 will permit the planetary sun gear 42 to overrun the brake 32 such that if the brake 32 is engaged, it will not interfere with the direct drive condition of the planetary gear arrangement.

The starting device 10 can be used with a conventional countershaft synchromesh type transmission as a replacement for the input friction clutch launch function. A disconnect clutch must be added between the starting device and the transmission for ratio change and may be manual in operation.

As is well known with internal combustion engines, transient torque spikes are produced as a result of the engine ignition. In currently available transmissions, these torque spikes can be accommodated by a torque converter with minimum transmission to the planetary gear arrangement of an automatic transmission. However, when efficiency and improvement devices, such as a torque converter clutch, are employed, a spring and friction damper arrangement must be incorporated to reduce the transmissibility of the mechanical shock.

The damper arrangements currently available generally do not permit actuation of the torque converter clutch at low engine speeds and therefore sacrifice some efficiency. Manual type or synchronmesh transmissions experience the same problem with the input clutches that are employed therewith. Generally, this transient torque is perceived by the operator when an attempt is made to drive the vehicle in a high gear ratio at low engine speeds.

The present invention will permit the deterrence or retardation of the transmission of engine torsional spikes. This is accomplished by the motor/generator control mechanism sensing an impending engine spike; i.e., spark plug firing, and decreasing the reaction torque, when clutch 34 is disengaged, to absorb the increased engine torque. When clutch 34 is engaged and the electric motor is in generating mode, torque will be increased, and when in motoring mode, torque will be decreased. Thus, the spike is prevented from being transmitted to the transmission output. Therefore, this starting device provides the added advantage of eliminating the need for a conventional damper arrangement. It is also desirable to maintain a small electrical load on the motor/generator 14 at all times to eliminate gear rattle in the planetary gearing arrangement 12.

From the foregoing description, it should be readily apparent to those skilled in the art that a compact, efficient, two-speed starting device is provided with the low range starting ratio being established by an electrically biased reaction member secured to the planetary gear arrangement.

The embodiments of the invention in which an exclusive property or privilege is claimed are defined as follows:

1. A starting device disposed to transmit power in the form of torque and rotary speed components from an engine to a transmission comprising: an input member connected to receive power from an engine; a planetary gear means having a first gear means connected with said input member, a second gear means meshing with the first gear means and operatively connected to an input of a transmission, and a third gear means meshing with said second gear means; retarding means comprising electrical energy translation means and selectively engageable friction drive establishing means operatively connected with said third gear means including a first element rotatable with the third gear means in a direction opposite to the rotary speed component of the engine and stationary means, said retarding means being operable to control the rotation of said third gear means for establishing a power path from the engine through the second gear means to the input of the transmission; and selectively engageable clutch means for selectively directly connecting two of said gear means for establishing a direct drive from the engine to the transmission.

2. The starting device defined in claim 1, wherein said electrical energy translating means is controllable to reduce the transmission of transient torques from the engine, and wherein said friction drive establishing means further includes a one-way drive establishing means operable to permit rotation of said third gear means in one direction when said clutch means is engaged.

3. The starting device defined in claim 1, wherein the electrical energy translating means is controllable for cooperation with the friction drive establishing means for reducing the effect of a coefficient of friction change in the friction drive establishing means during a transition therein from a dynamic to a static condition.

4. A starting device disposed to transmit power in the form of torque and rotary speed components from an engine to a transmission comprising: an input member connected to receive power from an engine; a planetary gear means having a first gear means connected with said input member, a second gear means meshing with the first gear member and operatively connected to an input of a transmission, and a third gear means meshing with said second gear means; retarding means comprising electrical energy translation means and selectively engageable friction brake means operatively connected with said third gear means including a first element rotatable with the third gear means in a direction opposite to the rotary speed component of the engine and stationary means, said retarding means being operable to control the rotation of said third gear means for establishing a power path from the engine through the second gear means to the input of the transmission; and selectively engageable clutch means for selectively preventing relative rotation between the gear means to establish a power path directly from the engine to the transmission.

* * * * *